(12) United States Patent
Cook et al.

(10) Patent No.: US 10,779,455 B1
(45) Date of Patent: Sep. 22, 2020

(54) WALK-BEHIND AERATOR DUAL HYDRO DRIVE

(71) Applicant: Stinger Equipment, Inc., LaGrange, KY (US)

(72) Inventors: David Michael Cook, LaGrange, KY (US); Joshua Michael Otto, Crestwood, KY (US)

(73) Assignee: STINGER EQUIPMENT, INC., Lagrange, KY (US)

( * ) Notice: Subject to any disclaimer, the term of this patent is extended or adjusted under 35 U.S.C. 154(b) by 0 days.

(21) Appl. No.: 16/161,780

(22) Filed: Oct. 16, 2018

Related U.S. Application Data

(60) Provisional application No. 62/573,588, filed on Oct. 17, 2017.

(51) Int. Cl.
*A01B 45/02* (2006.01)
*A01B 76/00* (2006.01)

(52) U.S. Cl.
CPC .............. *A01B 45/02* (2013.01); *A01B 76/00* (2013.01)

(58) Field of Classification Search
CPC ...................................................... A01B 45/02
USPC ....................................................... 172/21, 22
See application file for complete search history.

(56) References Cited

U.S. PATENT DOCUMENTS

| | | | |
|---|---|---|---|
| 1,157,670 A | 10/1915 | Boswell | |
| 1,778,334 A | 10/1930 | Pedersen | |
| 2,205,997 A | 6/1940 | Wallace et al. | |
| 2,229,497 A | 1/1941 | Dontje | |
| 2,713,816 A | 7/1955 | Berg | |
| 3,224,512 A | 12/1965 | Alexander | |
| 3,675,724 A | 7/1972 | Schneider | |
| 4,550,783 A | 11/1985 | Hansen | |
| 4,574,890 A | 3/1986 | Hansen et al. | |

(Continued)

FOREIGN PATENT DOCUMENTS

| CA | 366396 | 5/1937 |
|---|---|---|
| EP | 0140989 | 5/1985 |

(Continued)

OTHER PUBLICATIONS

Lawn Solutions 24" Dual Hydro Aerator, You Tube Video published on Nov. 27, 2010, https://www.youtube.com/watch?v=Yy2jG6vdwHU, Web.

(Continued)

*Primary Examiner* — Tara Mayo-Pinnock
(74) *Attorney, Agent, or Firm* — Middleton Reutlinger

(57) ABSTRACT

A walk-behind aerator with hydrostatic drives is disclosed herein. The aerator includes a frame, an engine, a first and a second hydrostatic drive, a first and a second drive wheel, a first and a second idler wheel, and a first and a second tine assembly. The first hydrostatic drive may power the first drive wheel and the first tine assembly and the second hydrostatic drive may power the second drive wheel and the second tine assembly. In some embodiments, the aerator may further include a first and a second drive chain, a first and a second tine shaft, one or more control levers, and one or more covers. The one or more control levers may be linked to the hydrostatic drives by one or more linkages through the frame. The covers may be located between the tine assemblies and the drive chains and linkages.

19 Claims, 18 Drawing Sheets

(56) References Cited

U.S. PATENT DOCUMENTS

| | | | |
|---|---|---|---|
| 4,602,687 A | 7/1986 | Hansen | |
| 4,638,867 A | 1/1987 | Hansen et al. | |
| 4,645,012 A | 2/1987 | Hansen et al. | |
| 4,723,607 A | 2/1988 | Hansen | |
| 4,750,565 A | 6/1988 | Hansen et al. | |
| 4,753,298 A | 6/1988 | Hansen et al. | |
| 4,773,486 A | 9/1988 | Huber et al. | |
| 4,830,145 A | 5/1989 | Hansen | |
| 4,867,244 A | 9/1989 | Cozine et al. | |
| 4,878,802 A | 11/1989 | Hansen et al. | |
| 4,926,947 A | 5/1990 | Cozine et al. | |
| 5,398,767 A | 3/1995 | Warke | |
| 5,628,369 A | 5/1997 | Brown | |
| 5,680,903 A | 10/1997 | Oliver | |
| 6,102,129 A | 8/2000 | Classen | |
| 6,249,993 B1 | 6/2001 | Armstrong et al. | |
| 6,708,773 B1 | 3/2004 | Kinkead et al. | |
| 8,291,991 B1 | 10/2012 | Cook | |
| 8,733,477 B1 | 5/2014 | Cook | |
| 2003/0201107 A1 | 10/2003 | Smith et al. | |
| 2006/0048952 A1* | 3/2006 | Classen | A01B 33/082 172/22 |
| 2012/0298022 A1* | 11/2012 | Bowen | A01B 45/02 111/69 |
| 2015/0107863 A1* | 4/2015 | Bryant | A01B 76/00 172/21 |

FOREIGN PATENT DOCUMENTS

| | | |
|---|---|---|
| GB | 472443 | 9/1937 |
| GB | 2347400 | 9/2000 |

OTHER PUBLICATIONS

Lawn Solutions Riding Aerator, You Tube Video published on Nov. 28, 2010, https://www.youtube.com/watch?v=Xc-eelbjN5w, Web.

Turfco XT5 Hydro Aerator, You Tube Video published on Mar. 24, 2016, https://www.youtube.com/watch?v=AaSXe9gStPs, Web.

Classen PowerSteer Aerators Power the Turn, You Tube Video, https://www.youtube.com/watch?v=d4zA1n2bHPI, published Apr. 7, 2015.

Turfco Direct TurnAer Aerators, You Tube Video, https://www.youtube.com/watch?v=y2cucOMNSIc, published Jul. 16, 2009.

Classen Riding Aerator, You Tube Video, https://www.youtube.com/watch?v=JI7nNjDI6D8, published Jul. 27, 2010.

Exmark Manufacturing Inc., 24" Stand-On Aerator, You Tube Video, https://www.youtube.comiwatch?v=RAMkD4AKRgl, published Dec. 29, 2017.

* cited by examiner

WALK-BEHIND AERATOR DUAL HYDRO DRIVE

CLAIM TO PRIORITY

This non-provisional patent application claims priority to and benefit of, under 35 U.S.C. § 119(e), U.S. Provisional Patent Application Ser. No. 62/573,588, filed Oct. 17, 2017, and titled "Walk-Behind Aerator Dual Hydro Drive", all of which is incorporated by reference herein.

TECHNICAL FIELD

Generally, a walk-behind aerator with hydrostatic drives is taught.

BACKGROUND

The golf course industry utilized and popularized turf aeration to promote grass root development. Aeration relieves soil compaction allowing for better air and water exchange with the root system. This allows the root system to develop while decreasing the need for fertilization and irrigation. Lawn maintenance contractors noticed the benefits of aeration and began applying the treatment to residential and commercial properties.

Equipment has evolved from large golf course style aerators to smaller walk behind units with residential lawns in mind. While the newer equipment is more appropriately sized for residential use they are extremely laborious to operate, difficult to turn, and lack high productivity.

Originally, residential aerators, such as walk behind units, had a solid tine shaft in the rear of the unit that prevented it from turning while the tines were in the ground. On these units, the tines must be manually lifted out of the ground to make turns which is very labor intensive. As the popularity of residential aerating increased, aerators evolved to provide some turning without lifting the tines out of the ground.

Although these "turning" aerators that utilize multiple belt drives or differentials with multiple chains turn better than the original aerators, they are still labor intensive.

The next evolution of aerators was a riding aerator with independent hydraulic drives. However, these aerators utilize a complex system, which make them complicated and maintenance intensive.

With the development of the residential aerator there is still a need for a walk-behind aerator with greater turning ability and ease of use without the complexity and maintenance issues.

SUMMARY OF THE INVENTION

One embodiment of the present invention provides a walk-behind aerator with the added benefits of having better performance by utilizing independent hydrostatic drives including a left hydrostatic drive and a right hydrostatic drive. The left hydrostatic drive independently powers a left front drive wheel and a left rear tine drive assembly and the right hydrostatic drive independently powers a right front drive wheel and a right rear tine drive assembly. Another embodiment of the present invention includes a lifting mechanism that raises and lowers two rear idler wheels which lowers and raises the tines in and out of the ground, respectively. Another embodiment of the present invention includes a right and left control lever and linkages to easily drive the aerator forward or in reverse, and at variable speeds. The left control lever and linkage controls the direction and speed of the left front drive tire and left rear tine drive assembly and the right control lever and linkage controls the direction and speed of the right front drive tire and the right rear tine drive assembly.

In some embodiments, an aerator is provided having a frame with at least a front and a back, an engine, a first and a second hydrostatic drive, a first and a second drive wheel, a first and a second idler wheel, and a first and a second tine assembly. The first and second idler wheels and the first and second tine assemblies are located toward the back of the frame. The first and second drive wheels are located toward the front of the frame. The first hydrostatic drive powers the first drive wheel and the first tine assembly and the second hydrostatic drive powers the second drive wheel and the second tine assembly. In some embodiments, the first and second idler wheels can be adjusted to raise and to lower the first and second tine assemblies. In some embodiments, the aerator may further include a first and a second drive chain and a first and a second tine shaft. The first and second idler wheels may be located rearward of the first and second tine shafts.

In some embodiments, an aerator is provided having a frame with at least a front and a back, an engine, one or more wheels, one or more tine assemblies, one or more drive chains, and one or more covers. The one or more covers may be located between the one or more drive chains and the one or more tine assemblies. In some embodiments, the one or more covers are held within the frame by one or more slots in the frame and one or more fasteners. At least one of said one or more wheels may be an idler wheel and the at least one idler wheel may be capable of being adjusted to raise and to lower the one or more tine assemblies. In some embodiments, the at least one idler wheel and the one or more tine assemblies may be located toward the back of said frame. At least one of said one or more wheels may be a drive wheel and the at least one drive wheel may be located toward said front of said frame.

In some embodiments, an aerator is provided having a frame with at least a front and a back, an engine, one or more wheels, one or more hydrostatic drives, one or more tine assemblies, and one or more control levers. The one or more control levers may be linked to said one or more hydrostatic drives through the frame. In some embodiments, the one or more control levers may be connected to the one or more hydrostatic drives by one or more linkages. In some embodiments, the aerator may further include one or more covers. The one or more covers may be located within the frame between the one or more linkages and the one or more tine assemblies. The one or more covers may be held within the frame by one or more slots in the frame and one or more fasteners. In some embodiments, at least one of the one or more wheels may be an idler wheel and the at least one idler wheel may be adjusted to raise and to lower the one or more tine assemblies. In some embodiments, the at least one idler wheel and the one or more tine assemblies may be located toward the back of the frame. At least one of the one or more wheels may be a drive wheel and the at least one drive wheel may be located toward the front of said frame. In some embodiments, the aerator may further include a tine cover.

BRIEF DESCRIPTIONS OF THE DRAWINGS

DETAILED DESCRIPTION

Figure 1:
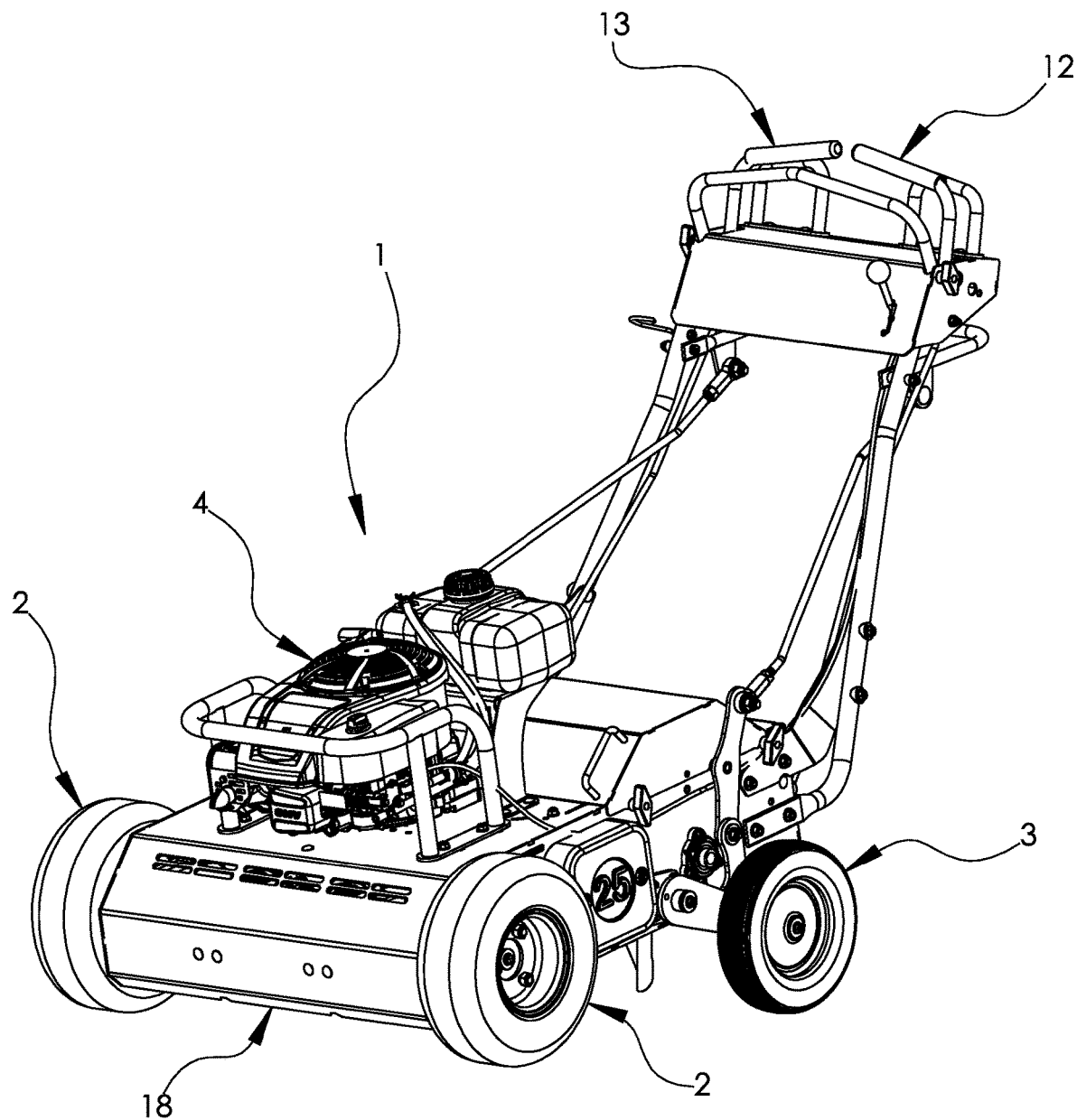
FIG. 1 is an isometric view of an embodiment of a walk-behind aerator.

FIGS. 1-16 show one embodiment of a walk-behind aerator 1. The dimensions shown in FIGS. 1-16 are in inches unless otherwise noted; however, these dimensions are shown for illustrative purposes only and are not to be understood as limiting. The walk-behind aerator 1 includes a frame 18, having front, back, left and right sides. The terms front, back, right, left and so on are utilized to facilitate understanding of the apparatus and components described herein, these terms are not intended to be limited to any particular direction. Engine 4 is mounted on frame 18. Engine 4 supplies power to a first hydrostatic drive 6 and a second hydrostatic drive 7, which independently power the rear right tine drive assembly 8 and rear left tine drive assembly 9, respectively. In some embodiments, the first hydrostatic drive system 6 may be referred to as a right hydrostatic drive system; in some embodiments, the second hydrostatic drive system 7 may be referred to as the left hydrostatic drive system. The frame 18 also supports the handle assembly 5 which allows the operator to control the aerator.

Figure 2:
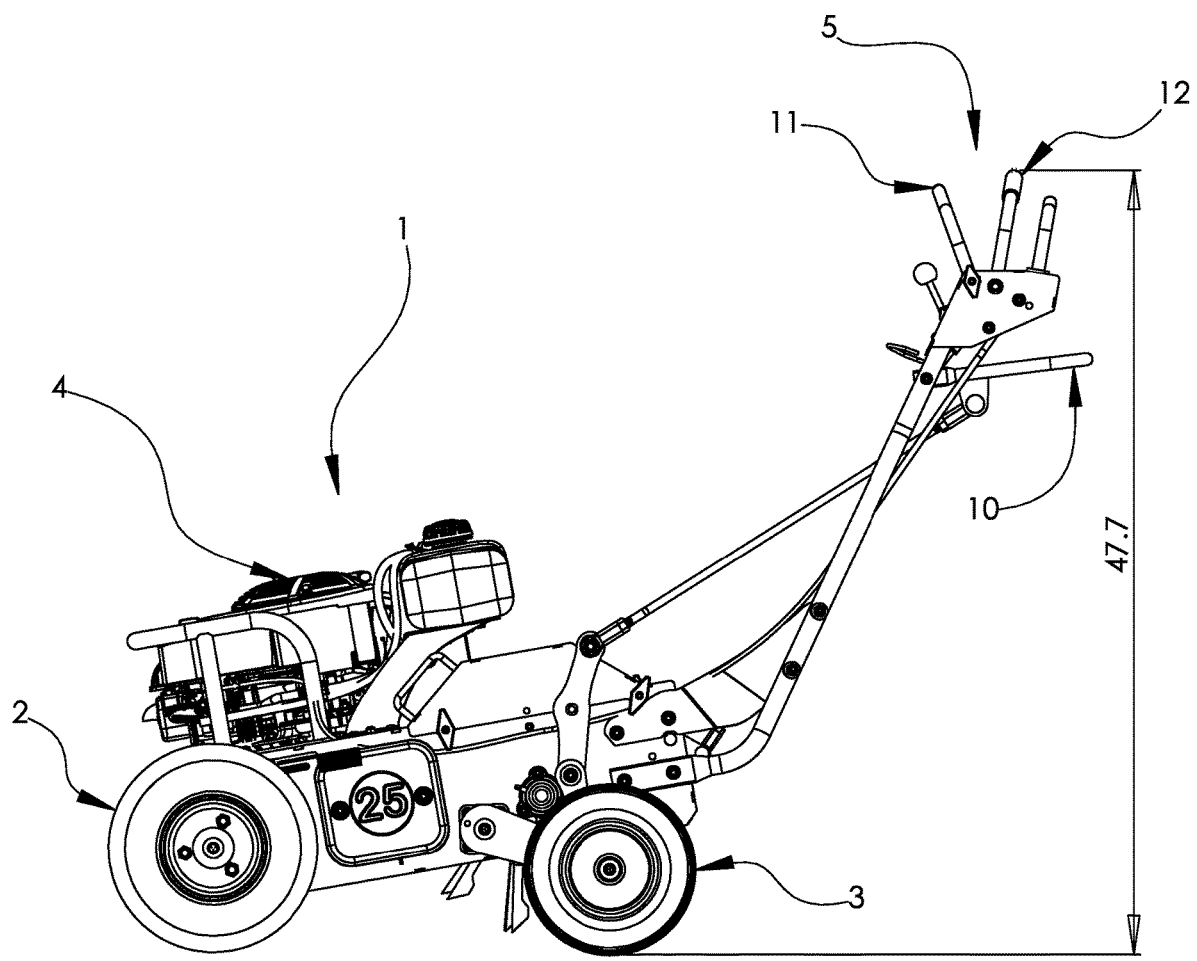
FIG. 2 is a side view of the walk-behind aerator in FIG. 1.

FIG. 2 shows a side view of walk-behind aerator 1. The drive wheels 2 can be used to move the unit forward and backward for transport when the aerator tines are out of the ground. The rear wheels 3 are idler wheels and help carry the weight of the machine and can be used to adjust the tine depth while aerating.

Figure 3:
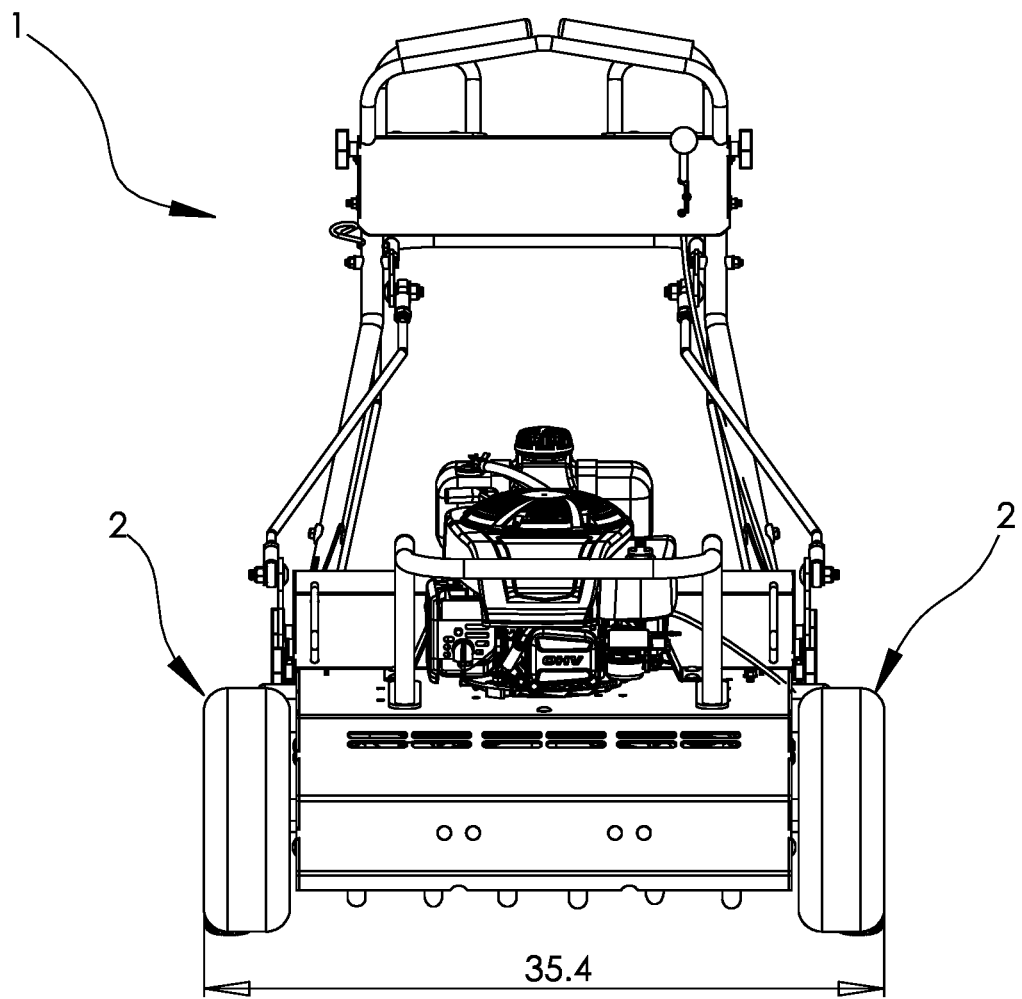
FIG. 3 is a front view of the walk-behind aerator in FIG. 1.
Figure 4:
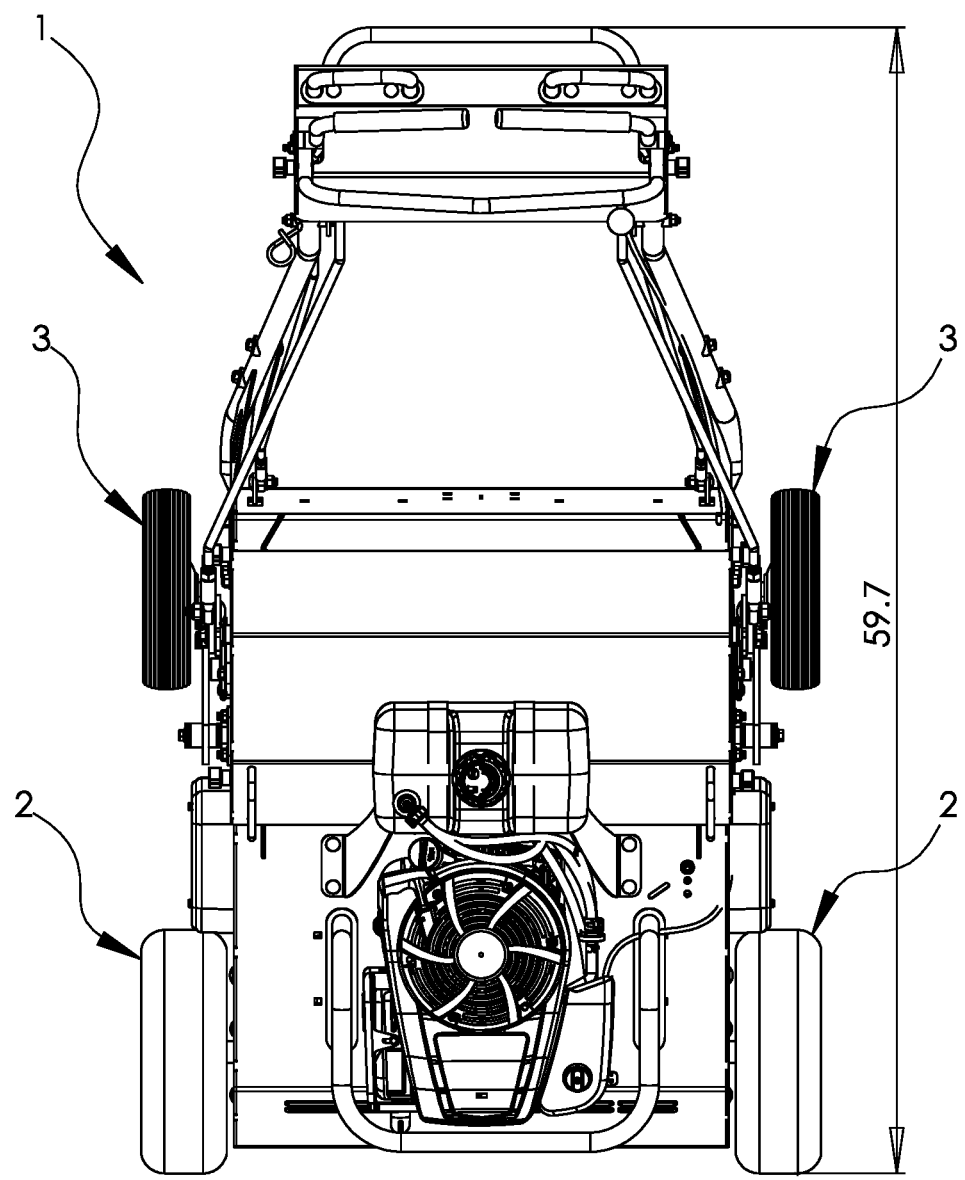
FIG. 4 is a top view of the walk-behind aerator in FIG. 1.
Figure 5:
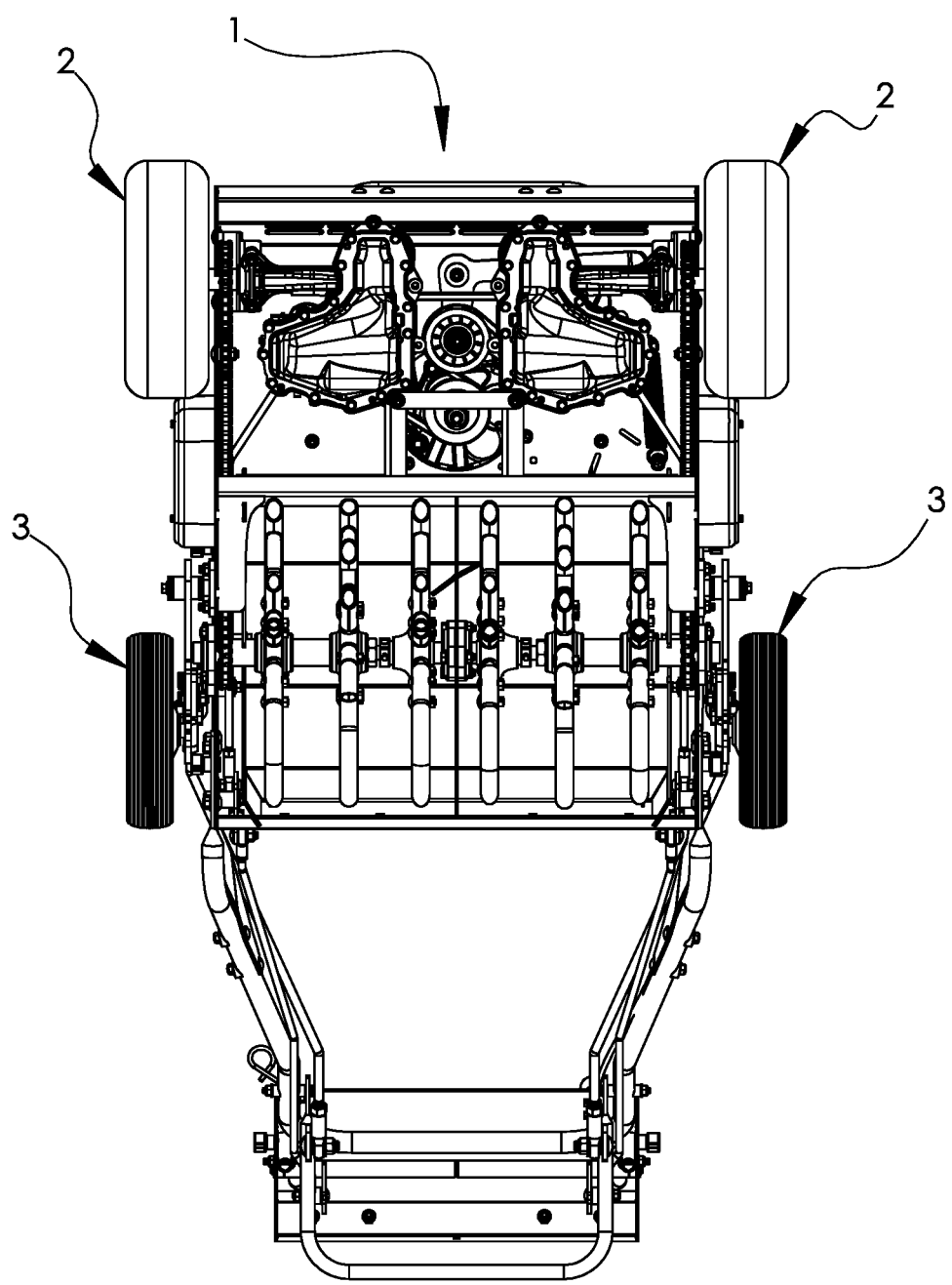
FIG. 5 is a bottom view of the walk-behind aerator in FIG. 1.

FIGS. 3-5 show a front view, top view, and bottom view of walk-behind aerator 1.

Figure 6:
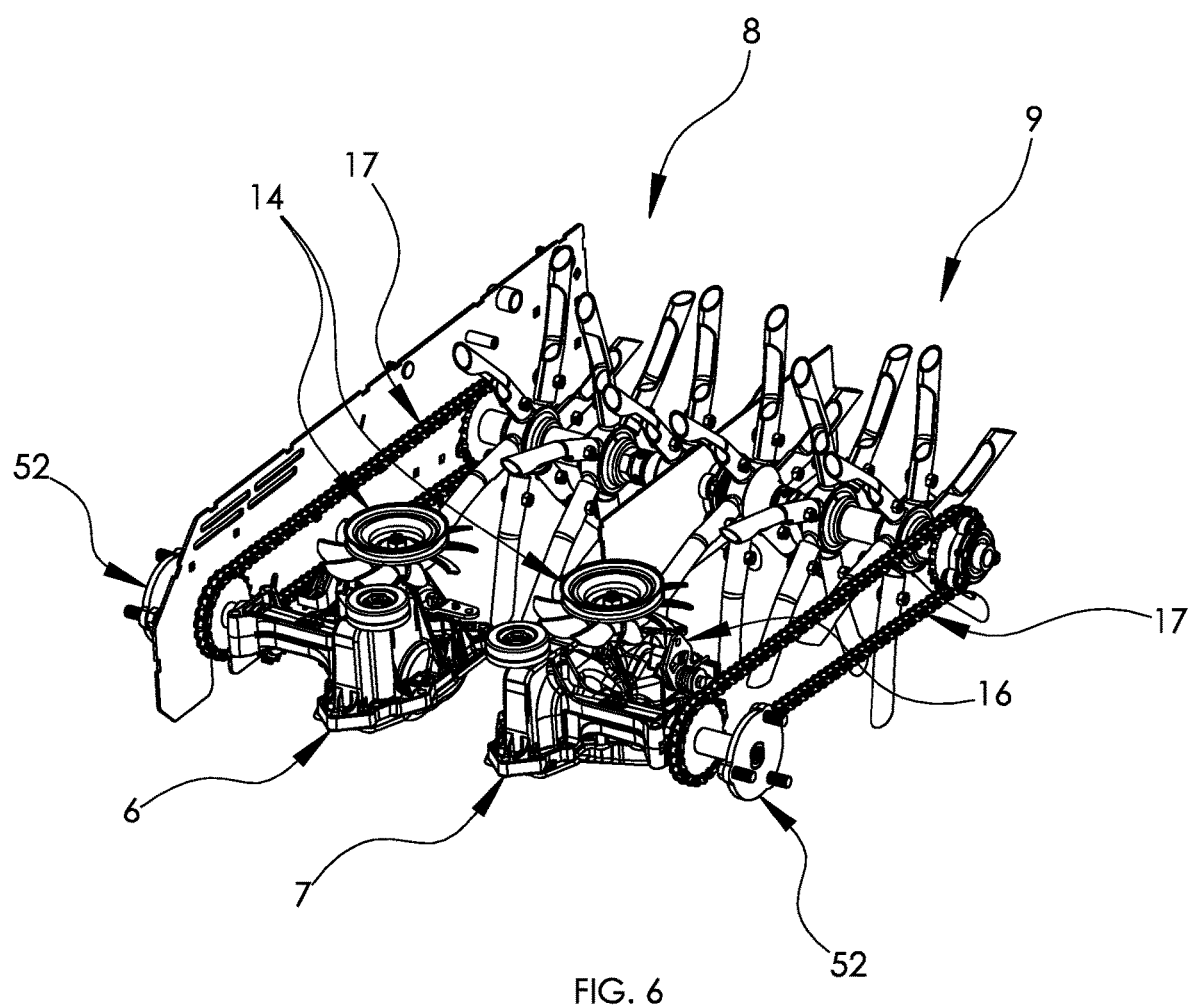
FIG. 6 is an isometric detailed view of the hydrostatic drives and the tine drive assemblies for the walk-behind aerator in FIG. 1.
Figure 7:
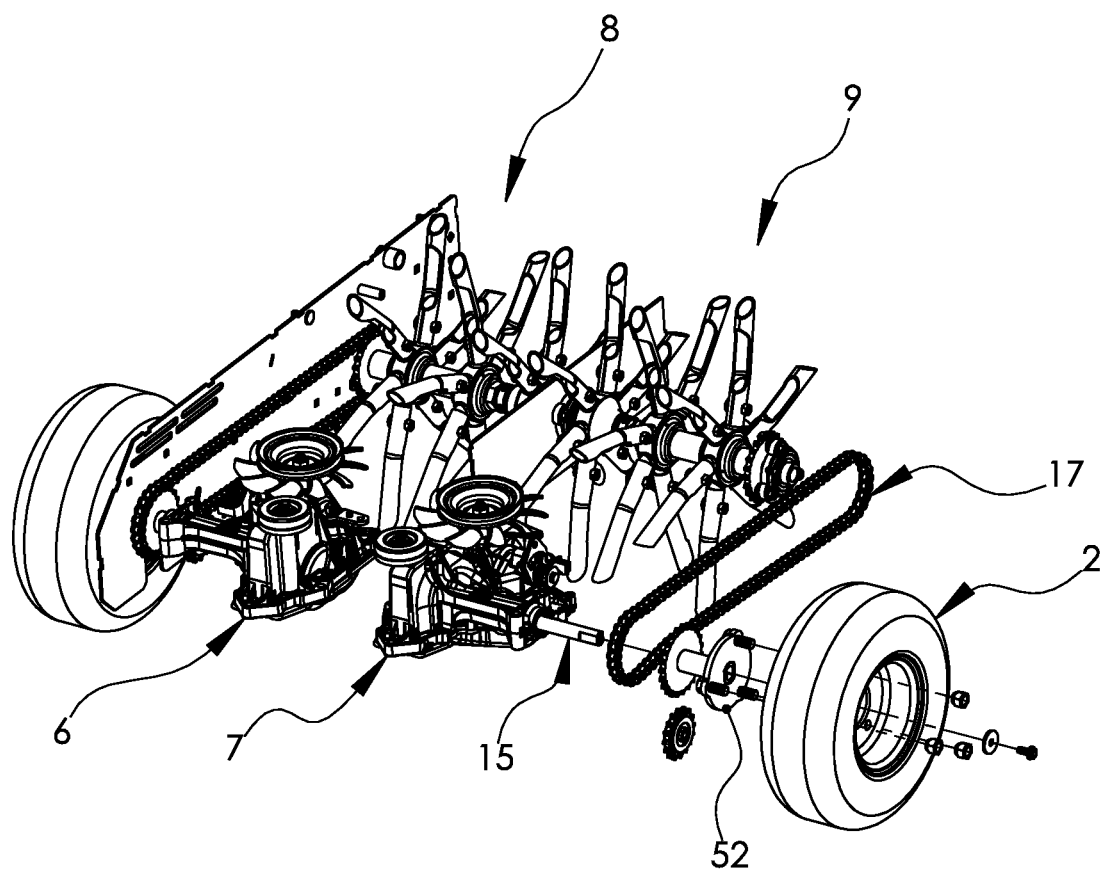
FIG. 7 is an exploded detailed view of FIG. 6.

FIGS. 6-7 show and isometric detailed view of the independent hydrostatic drive systems. In some embodiments, the first and second hydrostatic drive systems 6, 7 may be identical. In other embodiments, there may be differences between the first and second hydrostatic drive systems. In the embodiment illustrated in FIGS. 6-7 the first and second hydrostatic drive systems 6, 7 are identical, therefore only the second hydrostatic system 7 will be described. The independent hydrostatic drive 7 may have an input pulley 14 which takes power from the engine 4 allowing the hydrostatic drive to translate this power into variable speed and direction, which is based on the input position of control arm 16, through directional output shaft 15. The output shaft 15 may have a drive sprocket assembly 52 that transmits power to the left drive wheel 2 for transporting the unit when not aerating which drives and that also transmit power to chain 17 to drive left tine drive assembly 9.

Figure 8:
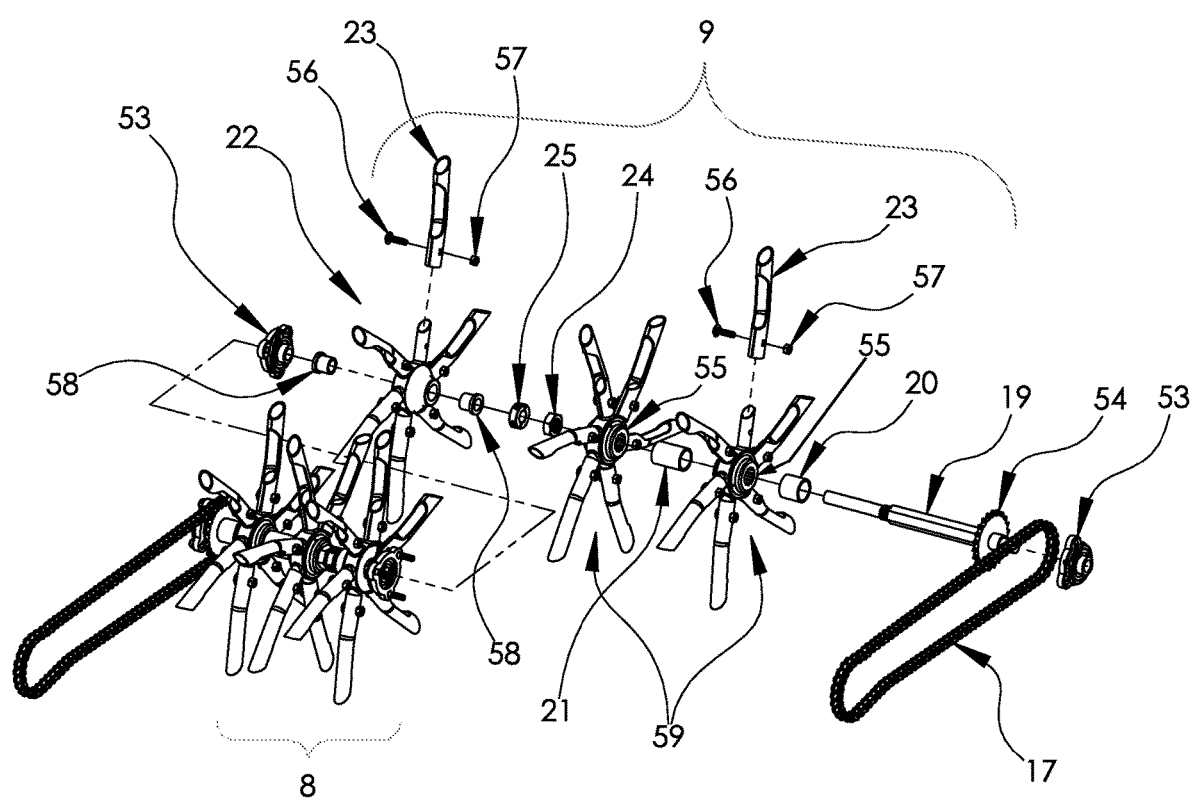
FIG. 8 is an exploded view of the tine drive assembly in FIG. 6.
Figure 9:
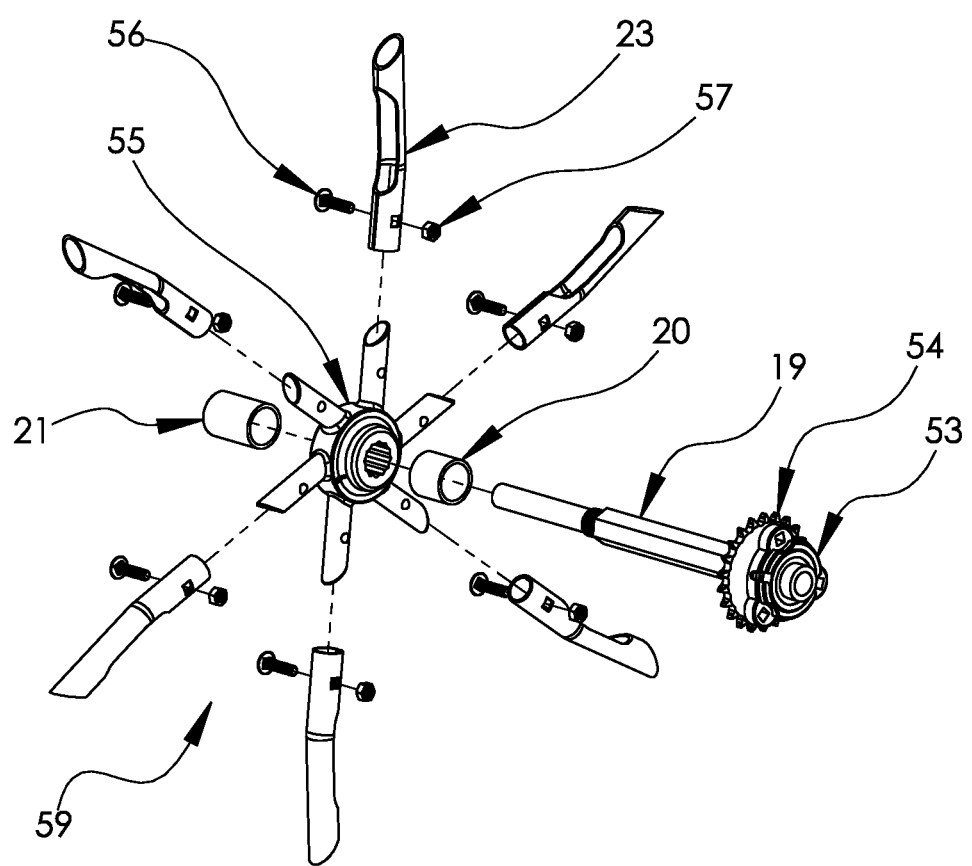
FIG. 9 is an exploded view of the tine disc in FIG. 6.

FIGS. 8-9 show an exploded view of the tine drive assembly 9. In some embodiments, the left and right tine drive assemblies may be identical. In other embodiments, the right and left tine assemblies may differ. In the embodiment illustrated in FIGS. 8-9 the right and left tine assemblies are identical, therefore only the left tine drive assembly will be described. The chain 17 transmits power from the hydrostatic drive 7 to the rear tine shaft 19 through sprocket 54. The rear tine shaft 19 is mounted to the frame 18 using bearing 53. The tine shaft 19 transmits torque to the tines 23 of tine discs 59 through the mating of the hex shaft of tine shaft 19 and the dodecagon-shaped (12-sided) tine drive casting 55 of the tine disc 59. The amount of torque transferred to the tines 23 of the tine discs 59 may vary. The drive castings 55 slide onto the drive shaft 19 and are indexed so the two castings 55 of the two tine discs 59 next to each other are out of phase. The castings 55 may have a 12-sided polygon for the mating surface and the tine shaft 19 may have a 6-sided polygon for the mating surface allowing the same casting 55 to be used while still keeping directly adjacent drive castings of the two tine discs 59 out of phase with each other.

The tine drive assembly 9 may consist of tine drive shaft 19 with sprocket 54 attached, a short spacer 20, a first tine drive casting 55 of tine disc 59, a long spacer 21, a second tine drive casting 55 of a second tine disc 59 installed out of phase with the first drive casting 55, and a jam nut 24 to hold it together. The terms long and short are intended to describe the length of spacer 20 relative to spacer 21 rather than the overall dimensions of the spacers themselves. The two tine discs 59 consist of the tine drive castings 55 with each having six aerator tines 23 attached using bolts 56 and nuts 57 on each tine 23. For easy turning, the third tine disc 22 may be a floating tine disc allowing it to rotate independently of the tine drive shaft 19 and tine discs 59 which are driven by the tine drive shaft 19. The tine disc 22 floats independently on bushings 58 and is held in place against the bearing 53 using a locking collar 25. The floating tine disc 22 also has six aerator tines attached using bolts 56 and nuts 57 on each tine 23. Tine drive assembly 9 may be held in place by a bearing 53 at each end of the drive shaft 19 which is mounted to the frame 18.

Figure 10:
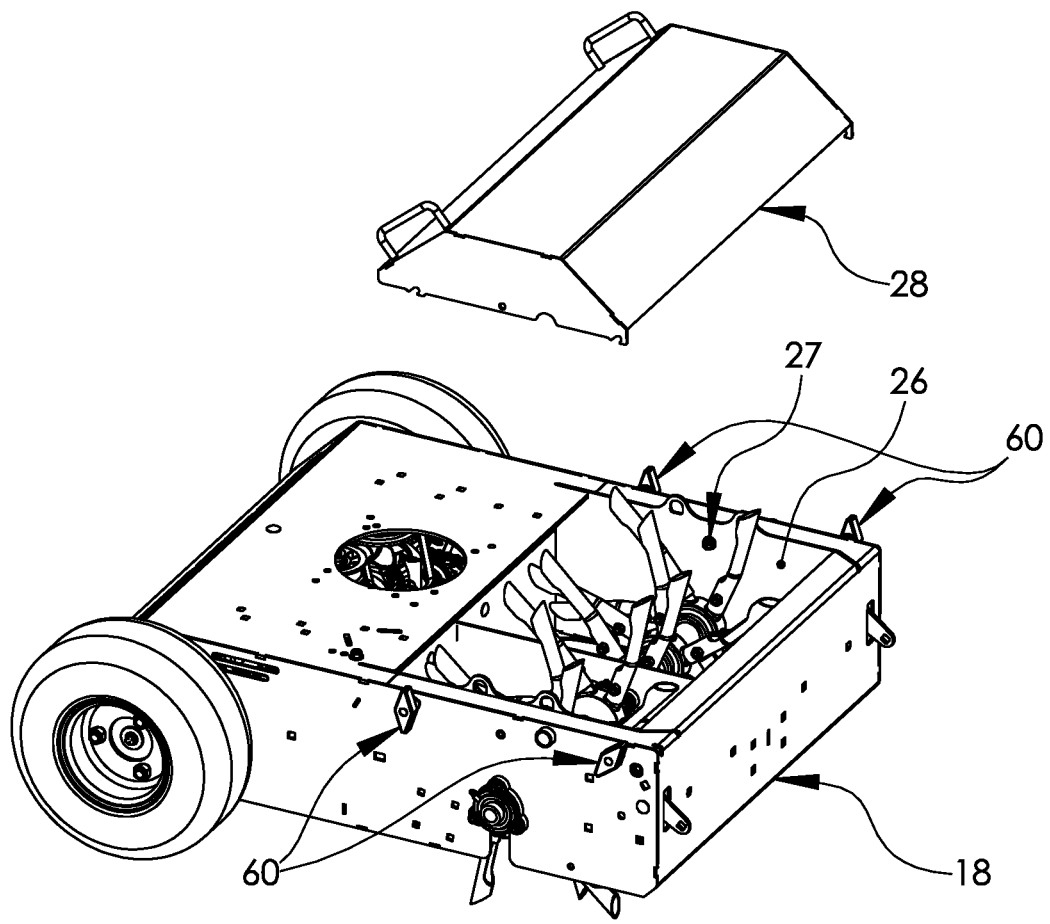
FIG. 10 is an isometric view of the walk-behind aerator with the tine cover removed to show the chain covers.
Figure 11:
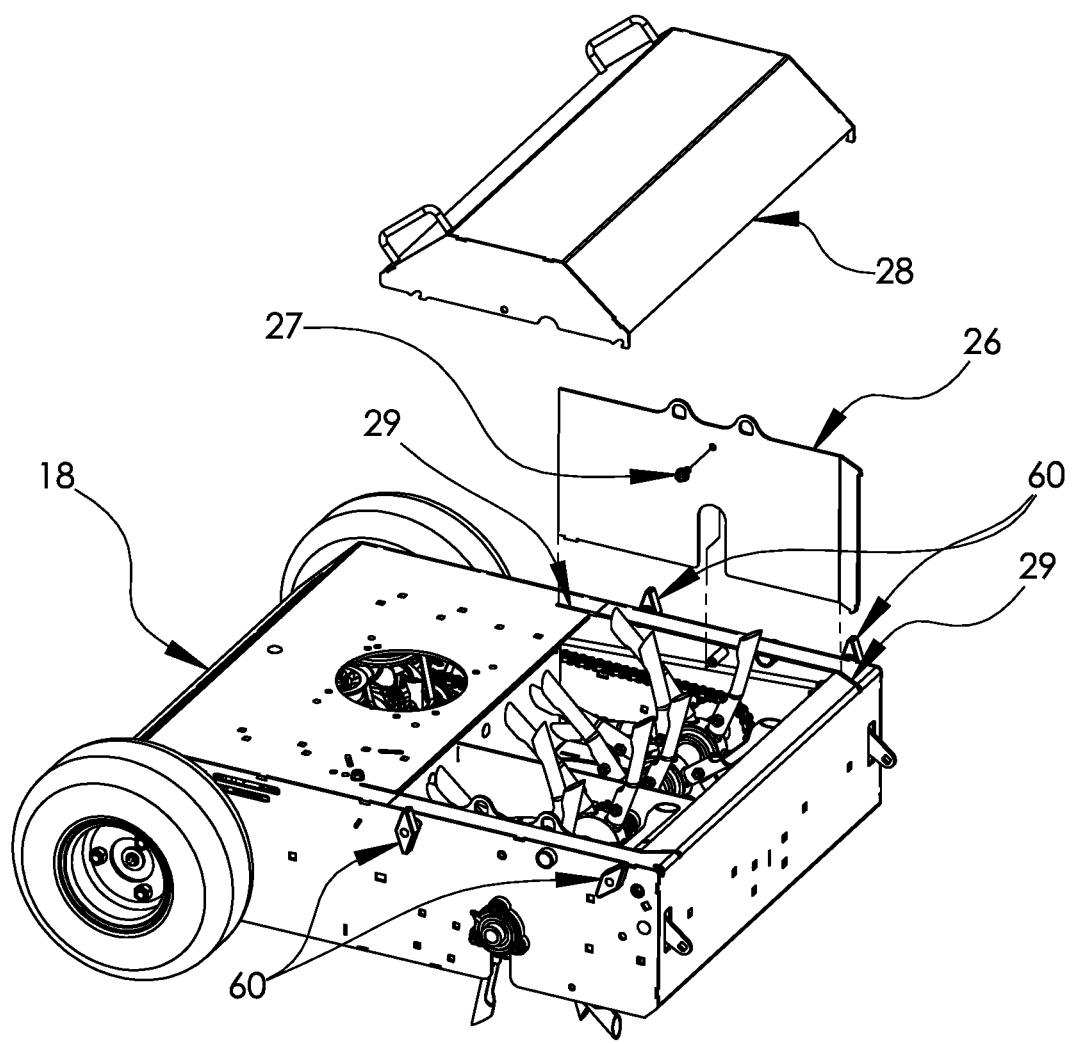
FIG. 11 is the view from FIG. 10 showing the tine cover and a chain cover removed.
Figure 12:
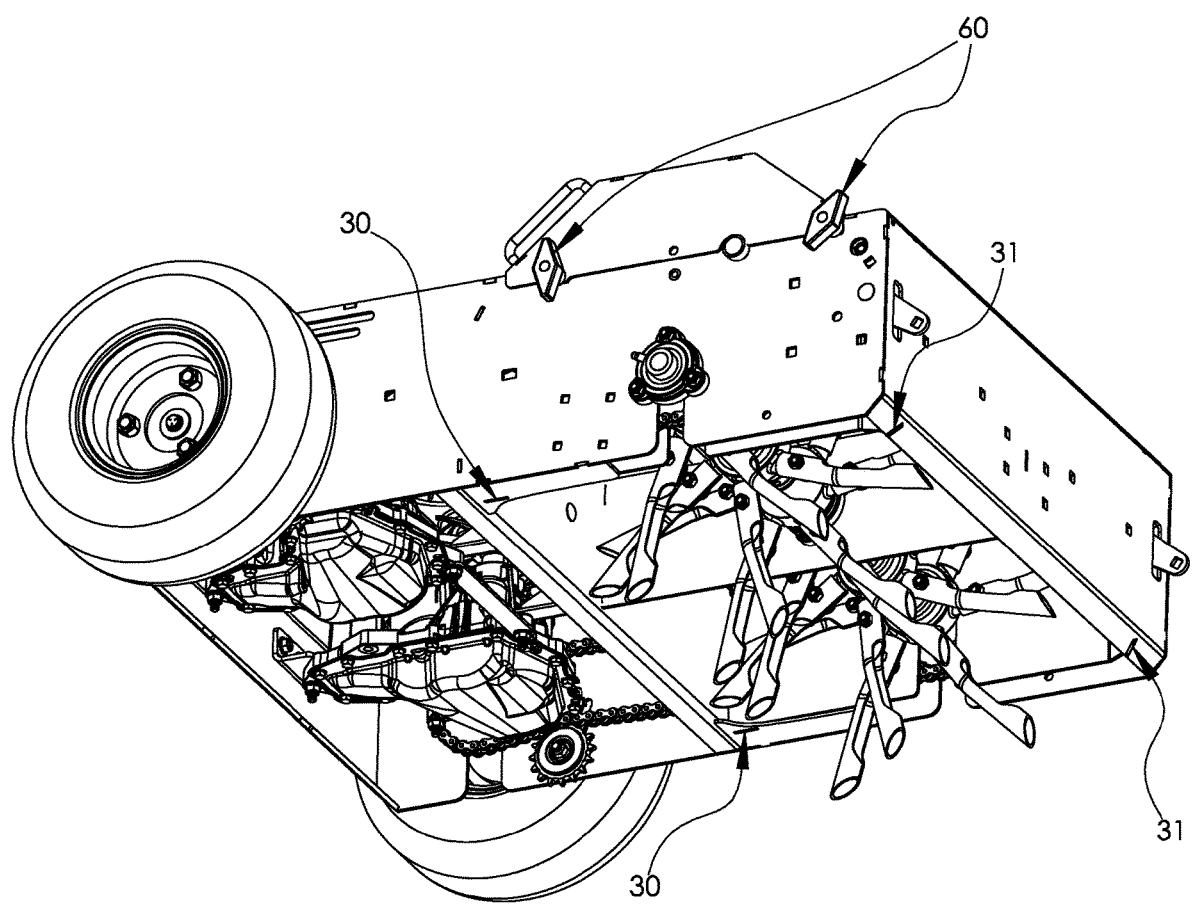
FIG. 12 is the bottom isometric view from FIG. 10 showing the tab location for the chain covers.

FIGS. 10-12 show the tine cover 28 and chain cover 26. Tine cover 28 can be removed by loosening one or more wing nuts 60 on either side of frame 18 and lifting the tine cover 28. Chain cover 26 protects the drive chains 17 and control linkages 45, 48, 49, and 51 from dirt and debris while aerating. The chain covers 26 may be removed by removing bolt 27 and pulling upward on the chain cover 26. The chain covers 26 may be held in place with slots 29 in the frame 18. The chain covers 26 are also held in place with slots 30 and 31 at the bottom of the frame 18 as shown in FIG. 12. In most instances, the chain covers are mirrored on each side of the unit, but the apparatus 1 is not so limited. There may be one chain cover to protect the chains and control linkages on the right of the aerator and another to protect the chains and control linkages on the left of the aerator. This cover may also open to the bottom, but is not so limited.

Figure 17:
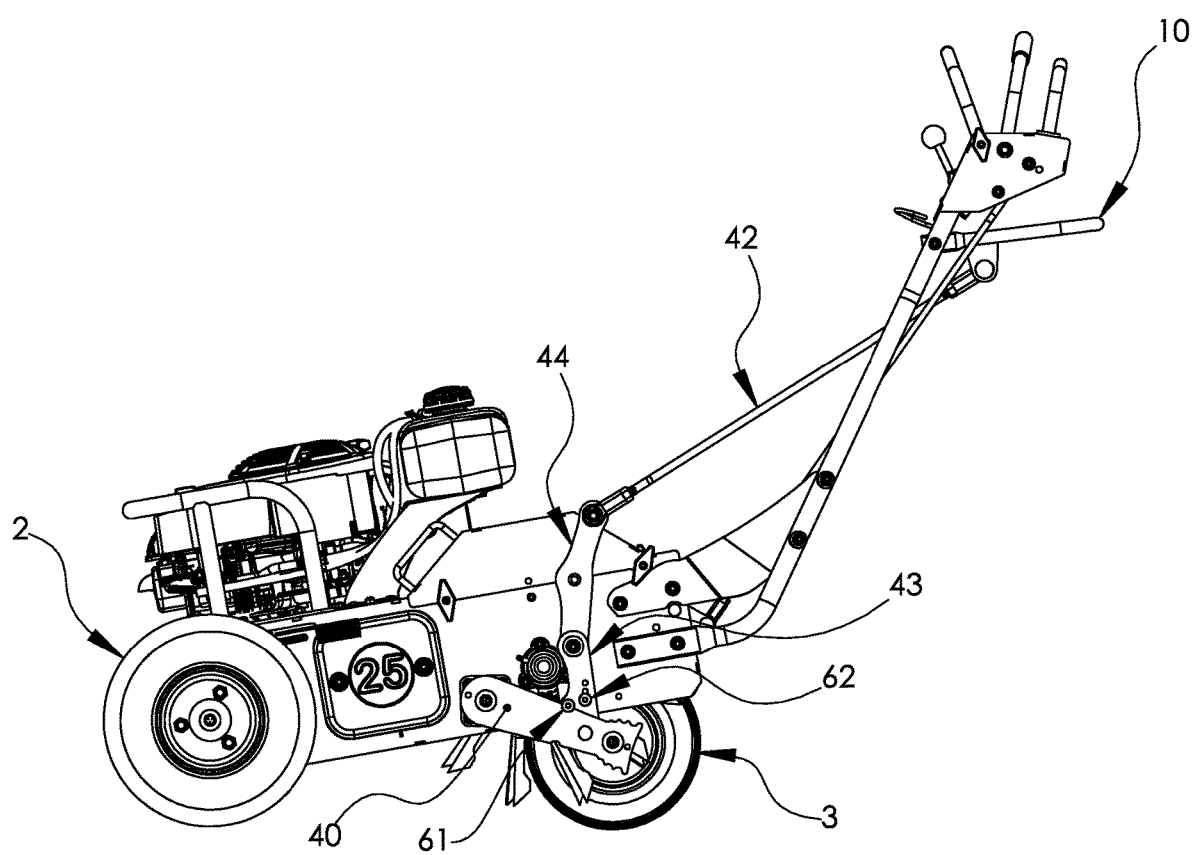
FIG. 17 is a detailed view showing the lift mechanism in the up position and thus the tines raised.
Figure 18:
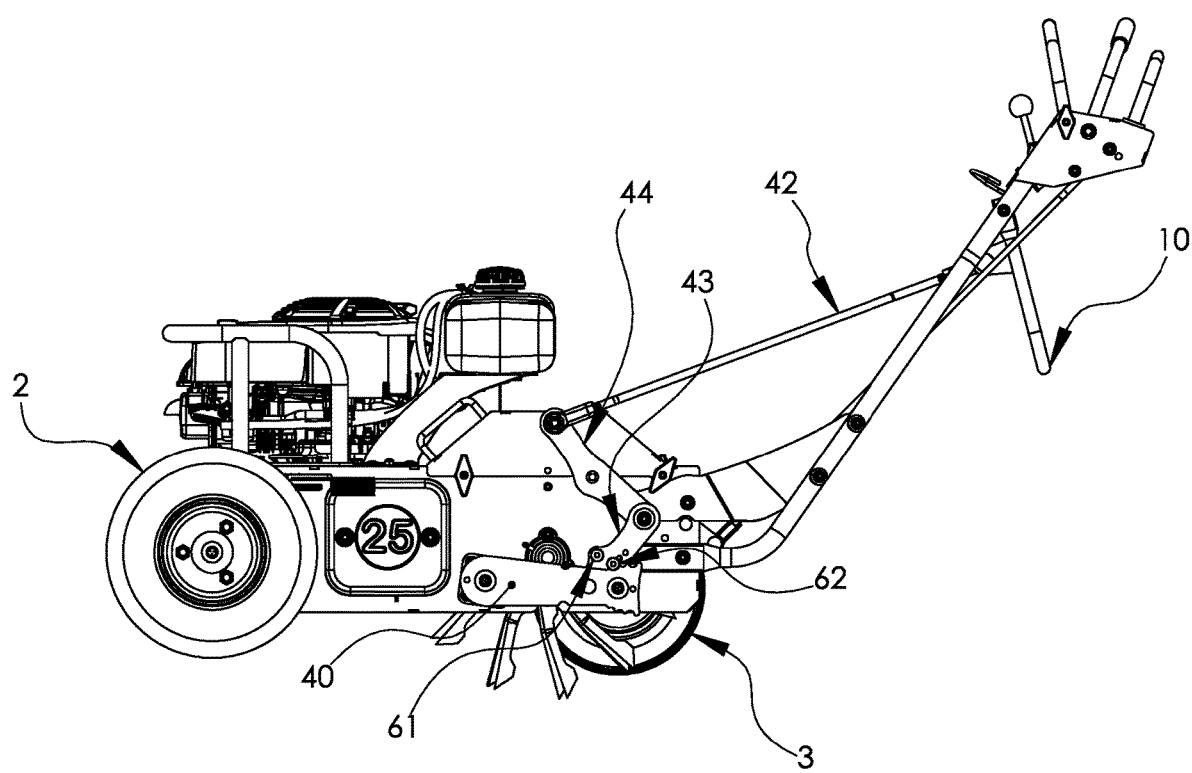
FIG. 18 is a detailed view showing the lift mechanism in the down position and thus the tines lowered.

FIGS. 13-14 and 17-18 show one side of the lift mechanism that is attached to the idler wheels 3 that lowers and raises the tines into and out of the ground. The other side of the aerator may have an identical mechanism attached to the other idler wheel 3. The left and right idler wheels 3 and the mechanism attached to each work in conjunction to lower and raise the tines. As shown in FIG. 17, the lift handle 10 is lifted to lower the idler wheels 3 and lift the tines. As shown in FIG. 18, pressing down on the lift handle 10 may raise the idler wheels 3 and lower the tines. The lift handle 10 may be connected through control linkage 42 to identical structure on both the left and right side of the aerator. The lift mechanism works to lower the tines by pressing down on the lift handle 10 which transmits a force through control linkage 42 to end 33 that is mounted to pivot bracket 44. Pivot bracket 44 is mounted to the frame 18 by using pivot bushings 34 which allows it to rotate as needed. Lift linkage 43 may be connected to the pivot bracket 44 through bolt 37 at one end and connected to the trail arm 40 at the other end by another bolt 45. A bearing 35 may be used at the connection at each end of lift linkage 43 to reduce the force required to lift the tines and also to reduce wear on the lifting assembly.

Bolt 37 passes through pivot bracket 44 and through the lift linkage 43, a first shim 36a, a bearing 35, a second shim 36b, a washer 38, and a nut 39 may be placed on the bolt 37 to provide a bearing pivot surface for lift linkage 43 to freely rotate about. At the opposite end of the lift linkage 43, the bearing pivot assembly may be repeated. Bolt 45 passes through the trail arm 40 and through lift linkage 43, first shim 36a, bearing 35, second shim 36b, washer 38, and a nut 39 are placed on the bolt 45 to provide a pivot surface for the lift linkage 43 to freely rotate. The trail arm 40 rotates freely at one end about the trail arm pivot 32 by rotating on pivot bushings 41. The trail arm pivot may be mounted to the side of the frame 18.

Figure 13:
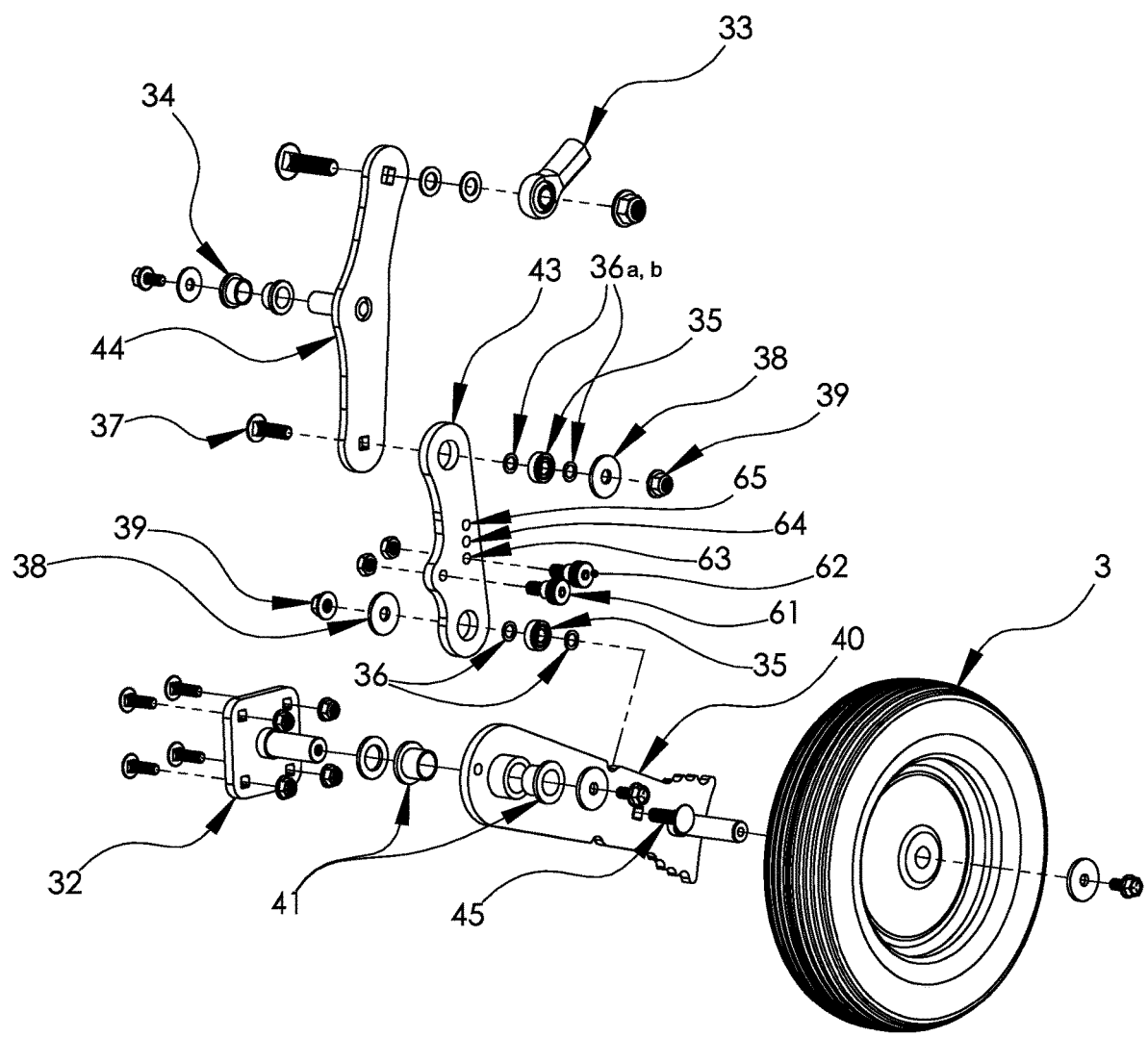
FIG. 13 is an exploded view showing the lifting mechanism for the aerator.

When lift handle 10 is lifted, pivot bracket 44 rotates backwards which causes lift linkage 43 to move forward causing trail arm 40 to rotate down, thereby lowering idler wheels 3 and lifting the tines. When lift handle 10 is pressed down, pivot bracket 44 rotates forward which causes lift linkage 43 to move backward causing trail arm 40 to rotate up, thereby raising idler wheels 3 and lowering the tines. As shown in FIG. 13, lift linkage 43 also has a first and second shoulder bolt 61 and 62, respectively. As shown in FIGS. 17 and 18, shoulder bolts 61 and 62 limit the movement of lift linkage 43. For example, the first left shoulder bolt 61 may limit the distance lift linkage 43 can move forward and thus limits the amount trail arm 40 can be rotated down, idler wheels 3 can be lowered, and the tines raised. Second shoulder bolt 62 may limit the distance lift linkage 40 can move backward and thus limits the amount trail arm 40 can be rotated up, idler wheels 3 can be raised, and the tines lowered. Further, second shoulder bolt can be moved into different openings 63, 64, or 65 in lift linkage 43 in order to change the distance lift linkage 43 can be moved backward and thus changing the distance trail arm 40 can be rotated up, the idler wheels 3 raised, and the tines lowered. In other words, second shoulder bolt 62 and openings 63, 64, and 65 allow for the tines to penetrate the ground at different depths with second shoulder bolt 62 in opening 65 allowing for the tines to be lowered the most and thus having the deepest penetration into the ground. Second shoulder bolt 62 in opening 63 provides the least amount of distance the tines can be lowered, thus having the shallowest penetration into the ground.

Figure 14:
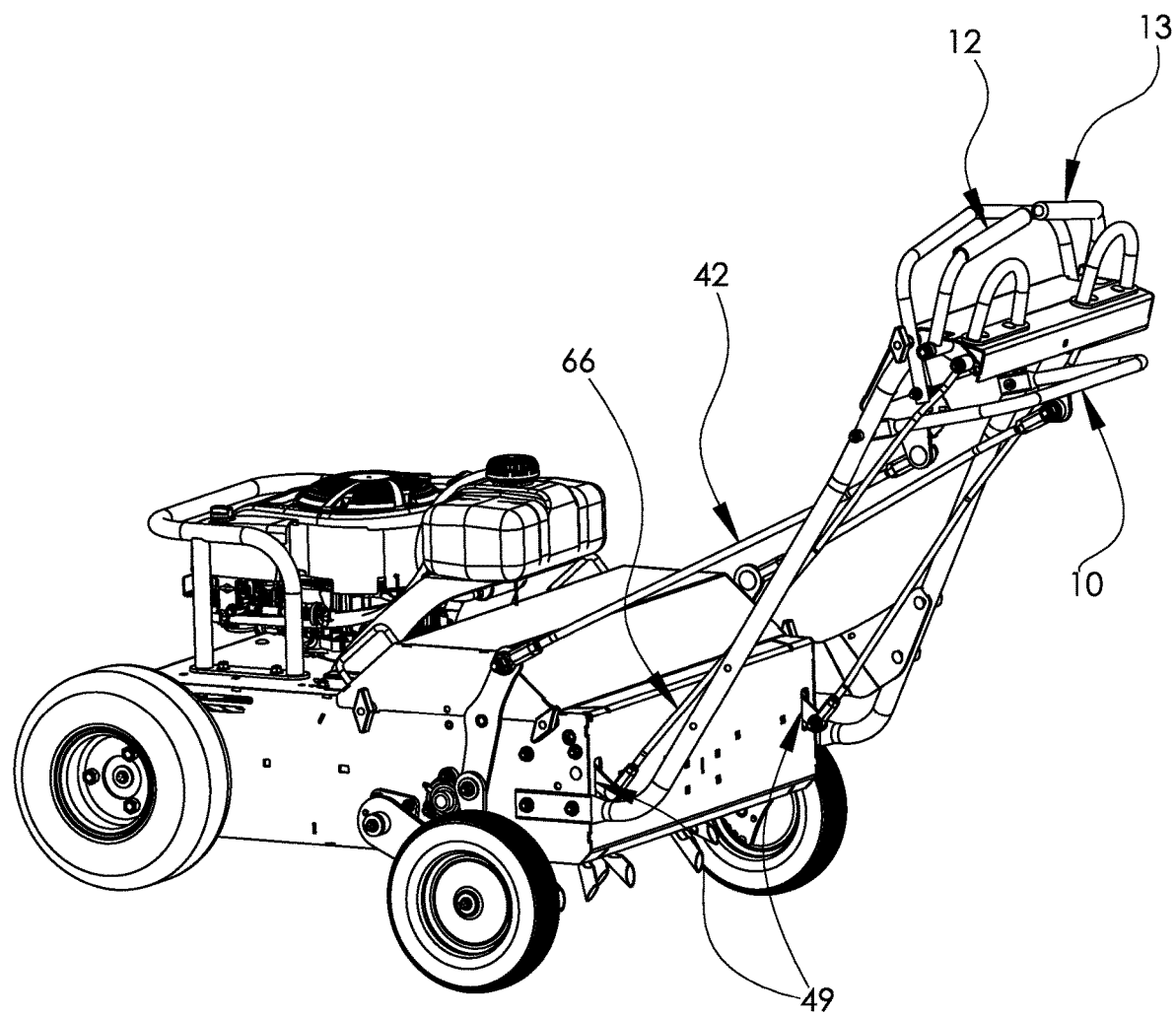
FIG. 14 is a rear isometric view showing the control linkages on the aerator.
Figure 15:
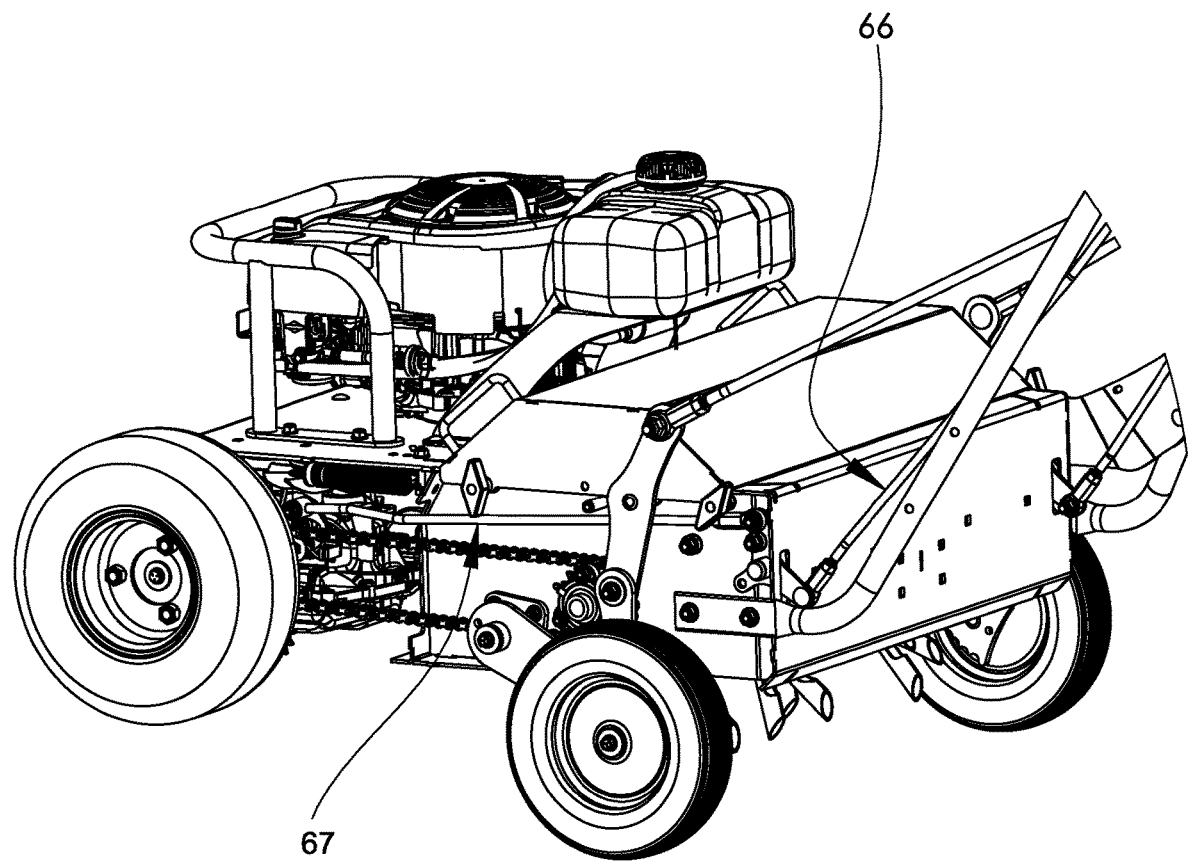
FIG. 15 is a detailed view of FIG. 14.
Figure 16:
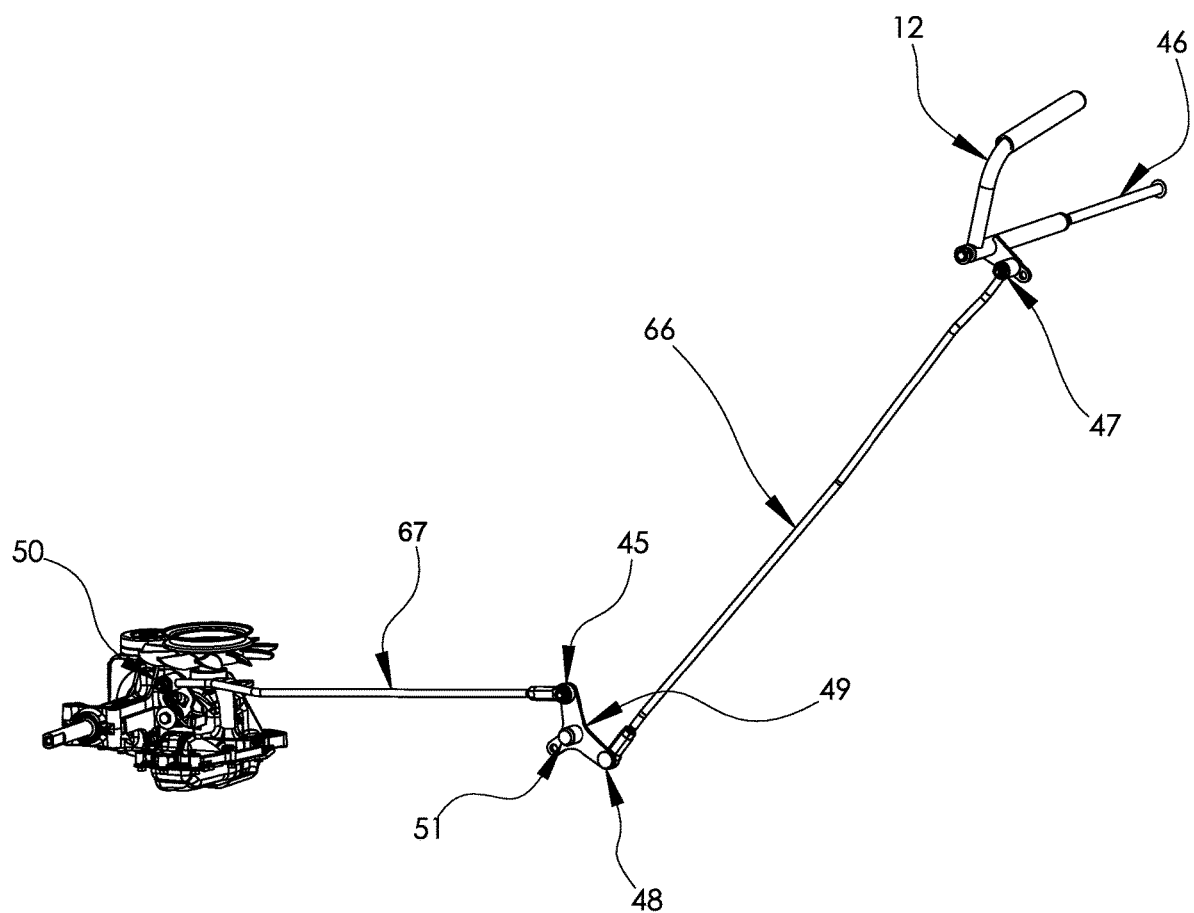
FIG. 16 is a detailed view of the linkages of FIG. 14.

FIGS. 14-16 shows the control linkages for the forward and reverse controls passing through the frame 18 and behind the chain covers. This may keep the linkages protected from either aerating debris inside the frame 18 or damage from use on the outside of the frame 18. The operator may use control lever 12 to control the speed and direction of the left wheel 2 and left tine drive assembly 9. The operator may use the control lever 13 to control speed and direction of the right wheel 2 and right tine drive assembly 8. In some embodiments, the left and right side controls may be mirrored so they are the same on either side. In other embodiments, the left and right controls may differ. In the embodiment illustrated in FIGS. 14-16, the right and left controls are identical, therefore only the left side operated by control lever 12 will be described.

When moving control lever 12, it pivots about pivot shaft 46. Control rod 66 is connected to control lever 12 at pivot point 47 at one end and to bell crank 49 at pivot point 48 at the opposite end. The bell crank 49 translates the motion from control rod 66 to control rod 67 by pivoting about point 51. Control rod 67 is connected to bell crank 49 and rotates at point 45 and at the other end to the transmission input arm 16 at pivot point 50. Pushing control lever 12 forward causes input arm 16 to rotate forward which causes the hydrostatic drive to rotate the drive wheel 2 and tine drive assembly 9 in the forward direction. The speed of drive wheel 2 and drive assembly 9 in the forward direction increases as control lever 12 is increasingly pushed forward and further rotated in the forward direction around shaft 46. Pulling control lever 12 backward causes input arm 16 to rotate backward which causes the hydrostatic drive to rotate the drive wheel 2 and tine drive assembly 9 in the backward direction. The speed of drive wheel 2 and drive assembly 9 in the backward direction increases as control lever 12 is increasingly pulled backward and further rotated in the backward direction around shaft 46.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. An aerator comprising:
   a frame having at least a front and a back;
   an engine;
   one or more drive wheels, wherein said one or more drive wheels are located toward said front of said frame;
   a first and a second idler wheel;
   a first and a second tine assembly, wherein said first and second idler wheels and said first and second tine assemblies are located toward said back of said frame; and
   a first and a second hydrostatic drive,
   wherein said first and second hydrostatic drives further comprise a first and a second output shaft configured to transmit power to said one or more drive wheels;
   wherein said first output shaft is coupled to said first tine assembly to independently transmit power from said first hydrostatic drive to said first tine assembly;
   wherein said second output shaft is coupled to said second tine assembly to independently transmit power from said second hydrostatic drive to said second tine assembly; and
   wherein said first and second tine assemblies are capable of being selectively and independently powered.

2. The aerator of claim 1, wherein said first and second idler wheels can be adjusted to raise and to lower said first and second tine assemblies.

3. The aerator of claim 2, wherein said first or second hydrostatic drive is configured to independently transmit power to said one or more drive wheels to move said aerator for transport when said first and second idler wheels are in a lowered position.

4. The aerator of claim 1, further comprising a first and a second tine shaft.

5. The aerator of claim 4, wherein said first and second idler wheels are located rearward of said first and second tine shafts.

6. The aerator of claim 1, wherein said first and second tine assemblies are configured to independently and with variable speeds move said aerator only while said first and second tine assemblies are aerating ground.

7. The aerator of claim 6, wherein said first and second hydrostatic drives are configured to transmit power to said first or second tine assembly such that said first or second tine assembly moves at a constant first speed and that the other of said first or second tine assembly moves at a second slower speed using powered hydrostatic braking in order to provide a controlled turn of said aerator while said first and second tine assemblies are aerating ground.

8. The aerator of claim 1, further comprising one or more control levers.

9. The aerator of claim 8, wherein said one or more control levers are connected to said first and second hydrostatic drives through said frame.

10. The aerator of claim 8, wherein said one or more control levers are connected to said first and second hydrostatic drives by one or more control rods and a bell crank.

11. An aerator comprising:
a frame having at least a front and a back;
an engine;
one or more wheels, wherein said one or more wheels includes at least one drive wheel disposed at said front of said frame;
one or more hydrostatic drives,
wherein each of said one or more hydrostatic drives further comprise an output shaft configured to transmit power to said at least one drive wheel;
one or more tine assemblies, wherein said one or more tine assemblies are located toward said back of said frame;
wherein said output shaft couples to each of said one or more tine assemblies to transmit power from each of said one or more hydrostatic drives to each of said one or more tine assemblies;
wherein each of said one or more tine assemblies are capable of being selectively and independently powered; and
one or more control levers,
wherein said one or more control levers are connected to said one or more hydrostatic drives through said frame.

12. The aerator of claim 11, wherein said one or more control levers are connected to said one or more hydrostatic drives by one or more control rods and a bell crank.

13. The aerator of claim 11, further comprising one or more covers.

14. The aerator of claim 13, wherein said one or more covers are located within said frame between said one or more control rods and said one or more tine assemblies.

15. The aerator of claim 14, wherein said one or more covers are held within said frame by one or more slots in said frame and one or more fasteners.

16. The aerator of claim 11, wherein at least one of said one or more wheels is an idler wheel.

17. The aerator of claim 16, wherein said at least one idler wheel can be adjusted to raise and to lower said one or more tine assemblies.

18. The aerator of claim 17, wherein said at least one idler wheel and said one or more tine assemblies are located toward said back of said frame.

19. The aerator of claim 11, further comprising a removable tine cover.

* * * * *